US009284160B2

(12) United States Patent
Brickell et al.

(10) Patent No.: US 9,284,160 B2
(45) Date of Patent: Mar. 15, 2016

(54) STABILIZATION DEVICES

(75) Inventors: Christopher Gavin Brickell, Docklands (AU); John Jerome Haigh, Fircrest, WA (US); David Arevalo Romo, Bonney Lake, WA (US)

(73) Assignee: Safeworks, LLC, Tukwila, WA (US)

( * ) Notice: Subject to any disclaimer, the term of this patent is extended or adjusted under 35 U.S.C. 154(b) by 491 days.

(21) Appl. No.: 13/127,449

(22) PCT Filed: Nov. 11, 2009

(86) PCT No.: PCT/US2009/064064

§ 371 (c)(1),
(2), (4) Date: May 3, 2011

(87) PCT Pub. No.: WO2010/056766

PCT Pub. Date: May 20, 2010

(65) Prior Publication Data

US 2011/0214949 A1 Sep. 8, 2011

Related U.S. Application Data

(60) Provisional application No. 61/113,428, filed on Nov. 11, 2008.

(51) Int. Cl.
*B66B 7/02* (2006.01)
*F16B 2/02* (2006.01)
(Continued)

(52) U.S. Cl.
CPC ................ *B66B 7/023* (2013.01); *B66B 7/024* (2013.01); *B66B 7/06* (2013.01); *B66B 9/187* (2013.01)

(58) Field of Classification Search
CPC ........... B66B 7/02; B66B 7/06; B66B 7/024; B66B 7/023; B66B 9/187
USPC ........................................ 187/407, 413, 408
See application file for complete search history.

(56) References Cited

U.S. PATENT DOCUMENTS 3,054,586 A 9/1962 Kirkup
3,240,863 A 3/1966 Brede
3,519,101 A 7/1970 Sieffert
(Continued)

FOREIGN PATENT DOCUMENTS

DE 1269789 B * 6/1968
EP 0867395 A2 9/1998
(Continued)

OTHER PUBLICATIONS

English Machine Translation of DE 1269789 B.*
(Continued)

*Primary Examiner* — William E Dondero
*Assistant Examiner* — Diem Tran
(74) *Attorney, Agent, or Firm* — Baker & Hostetler LLP

(57) ABSTRACT

A system for stabilizing the vertical motion of an object in a wind power generating tower comprises at least one static guide, and a guide component attached to the object, e.g., an elevator car, constrained to the proximity of the static guide. In addition, at least one further containment, e.g., a wirefix, coupled to the static guide is able to pass through the first containment as the object moves vertically in the tower. Moreover, the further containment is disposed to maintain the static guide in a fixed relationship to a mounting structure, and the further containment is disposed for in-situ attachment.

4 Claims, 10 Drawing Sheets

(51) Int. Cl.

| | |
|---|---|
| ***B66B 7/06*** | (2006.01) |
| ***B66B 9/187*** | (2006.01) |

(56) References Cited

U.S. PATENT DOCUMENTS

| | | | | |
|---|---|---|---|---|
| 5,080,199 A | | 1/1992 | McCallum, III | |
| 5,742,982 A | * | 4/1998 | Dodd et al. | 24/16 R |
| 6,193,016 B1 | * | 2/2001 | Hollowell et al. | 187/250 |
| 8,499,896 B2 | | 8/2013 | Midtgaard | |
| 2001/0018783 A1 | * | 9/2001 | Fischer | 24/20 R |
| 2011/0067959 A1 | * | 3/2011 | Midtgaard | 187/407 |

FOREIGN PATENT DOCUMENTS

| | | | |
|---|---|---|---|
| JP | 2875602 B2 | * | 3/1999 |
| WO | WO 00/68132 A1 | | 11/2000 |
| WO | WO 2010/056766 | | 5/2010 |

OTHER PUBLICATIONS

European Application No. 09826684.4; Extended European Search Report; dated Dec. 5, 2014; 5 pages.

* cited by examiner

STABILIZATION DEVICES

CROSS REFERENCE TO RELATED APPLICATIONS

This application is the National Stage of International Application No. PCT/US2009/064064, filed. Nov. 11, 2009, which claims the benefit of U.S. Provisional Application No.61/113,428, filed Nov. 11, 2008, the disclosures of which are incorporated by reference herein in their entireties.

BACKGROUND

Many techniques for stabilizing an elevator in a wind tower are in current practice by companies such as Power Climber Wind, Avanti, Tractel, Greifzug and others. Such techniques typically guide an elevator during vertical motion throughout the tower by using at least two vertically strung tensioned guide wires, where the guide wires are typically positioned on either side of the elevator and coupled to the elevator in such a manner as to allow vertical motion without restraint, but prevent or limit lateral and rotational motion. Typically a wind tower is 200 to 400 feet high and may include intermediate landings placed throughout the tower. Such landings are generally provided with an aperture through which the elevator may pass, and the guide wires are localized at the landing within a wirefix at each aperture and at the top and bottom of the tower to guide the elevator through the landing aperture without collision. The tension in each guide wire may be in the range 500 to 1000 lbs force to provide a strong horizontal stabilizing force on the elevator to limit unwanted motion between wirefix locations.

In the following disclosure, the term “guide wire” encompasses a wire used to constrain the path of an elevator; the term “guide component” encompasses a device attached to an elevator to connect to a guide wire; and the term “wirefix” encompasses a localizing device attached to a guide wire.

SUMMARY

In accordance with one illustrative embodiment of the invention, a system for stabilizing the vertical motion of an object in a wind power generating tower comprises at least one static guide, and at least one first containment attached to the object constrained to the proximity of the static guide. In addition, at least one further containment coupled to the static guide is able to pass through the first containment. Moreover, the further containment is disposed to maintain the static guide in a fixed relationship to a mounting structure, and the further containment is disposed for in-situ attachment.

Accordingly, in the illustrative embodiment described herein, limitations of the prior art in relation to the design and use of a further containment in the form of a wirefix are resolved. For example, typically an object for vertical movement in a tower, such as an elevator car, has an attached first containment, such as guide component that runs vertically on a fixed static guide, such as a guide wire, which in concert act to constrain lateral motion. Where the guide wire is coupled to the tower proximate a length of the guide wire at, for example, a landing using the wirefix, the guide component on the elevator is constructed such that it will transition the wirefix without impediment or interruption while maintaining stabilization of the elevator.

The prior art discloses various implementations of the wirefix and guide component. A specific limitation of existing implementations is difficulty of replacement of a wirefix with the guide wire threaded through it. The illustrative embodiments of the present invention employ a wirefix that may be fitted or removed in-situ without relaxing the tension in the guide wire, thereby reducing service time and cost, and maintaining system reliability by eliminating disturbance to the guide wire tensioning.

For example, the wirefix is removably coupled between the length of guide wire tensioned between an upper fixed portion and a lower fixed portion of the tower. The wirefix has a channel though which the guide wire passes wherein the wirefix may be removed from the guide wire without the need for de-tensioning the guide wire.

The wirefix can be configured so that the channel may be opened about the tensioned guide wire to couple or decouple the wirefix to the guide wire. For example, the wirefix may comprise two halves that may be separated to open the channel to couple of decouple the wirefix to the guide wire. In another example, the channel portion may be formed by a single piece having an opening formed in the channel for accepting a tensioned guide wire.

BRIEF DESCRIPTION OF THE DRAWINGS

The foregoing summary, as well as the following detailed description of preferred embodiments, is better understood when read in conjunction with the appended drawings. For the purposes of illustration, there are shown in the drawings exemplary embodiments; however, the present disclosure is not limited to the specific methods and instrumentalities disclosed. In the drawings.

DETAILED DESCRIPTION OF ILLUSTRATIVE EMBODIMENTS

Certain specific details are set forth in the following description and figures to provide a thorough understanding of various embodiments of the invention. Certain well-known details often associated with tower elevators are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1A:
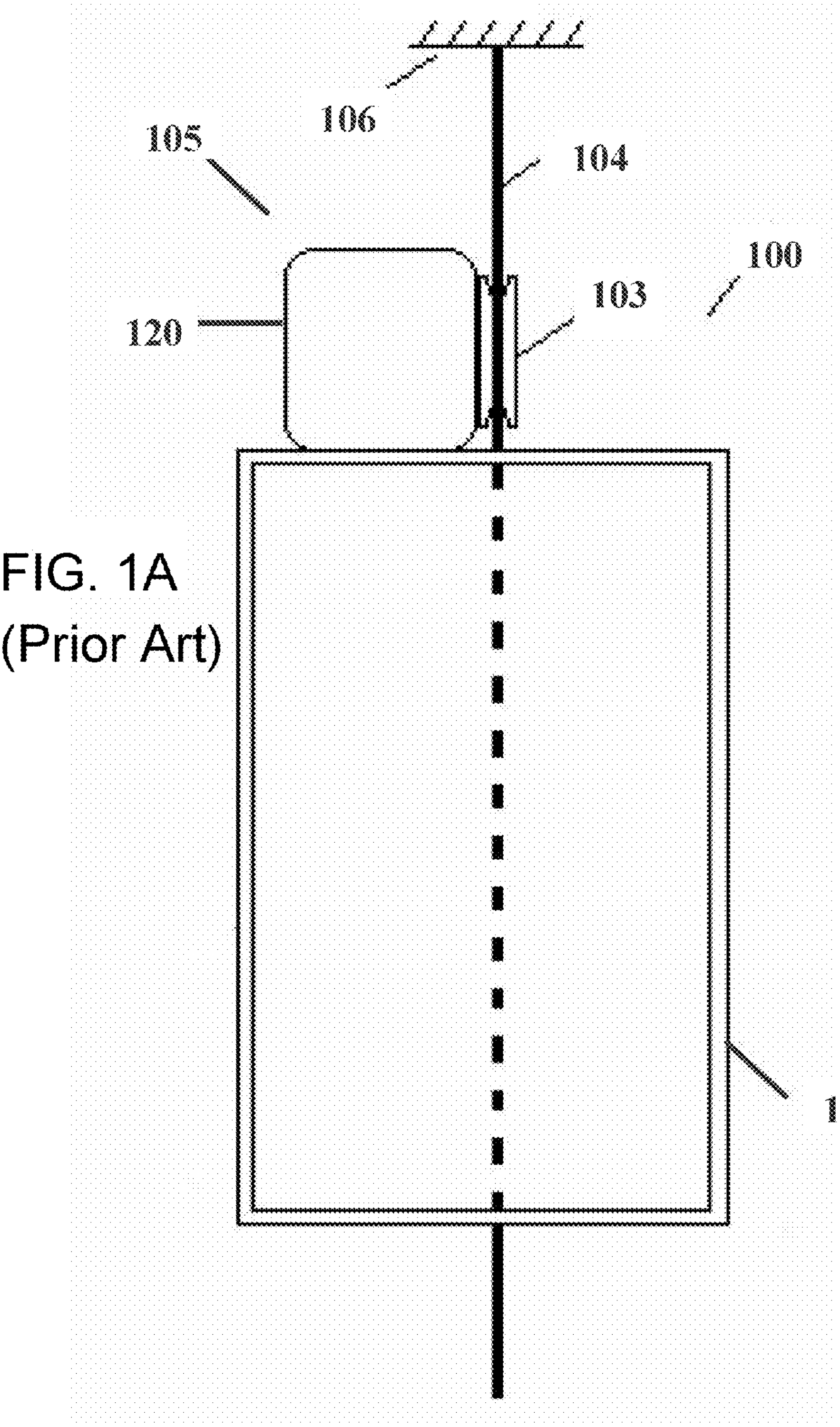
FIG. 1A (Prior Art)
FIG. 1A shows a diagrammatic representation of an example wind tower elevator car.

FIG. 1A diagrammatically shows a typical elevator 100 installation in a tower, such as a wind tower. The elevator 100 typically has a fraction hoist mechanism 105 coupled to an elevator car 1. Hoist mechanism 105 has an electric motor 120 that is coupled to and rotationally drives a sheave 103 via a reduction gearbox (not shown). Although a traction hoist is used here to illustrate the operation of the elevator, a drum type hoist could also be used.

A power source (not shown) is selectively coupled to the electric motor. Selective application of the power source to electric motor 120 causes rotation of the sheave 103 in a clockwise or counter clockwise direction. Elevator car 1 is coupled to a stationary suspension wire 104 by wrapping around sheave 103. Suspension wire 104 is fixed to a stationary structural member 106. As such, when electric motor 120 rotates sheave 103, the rotation of sheave 103 causes elevator car 1 to effectively climb up or down suspension wire 104, depending on the direction of rotation.

Figure 1B:
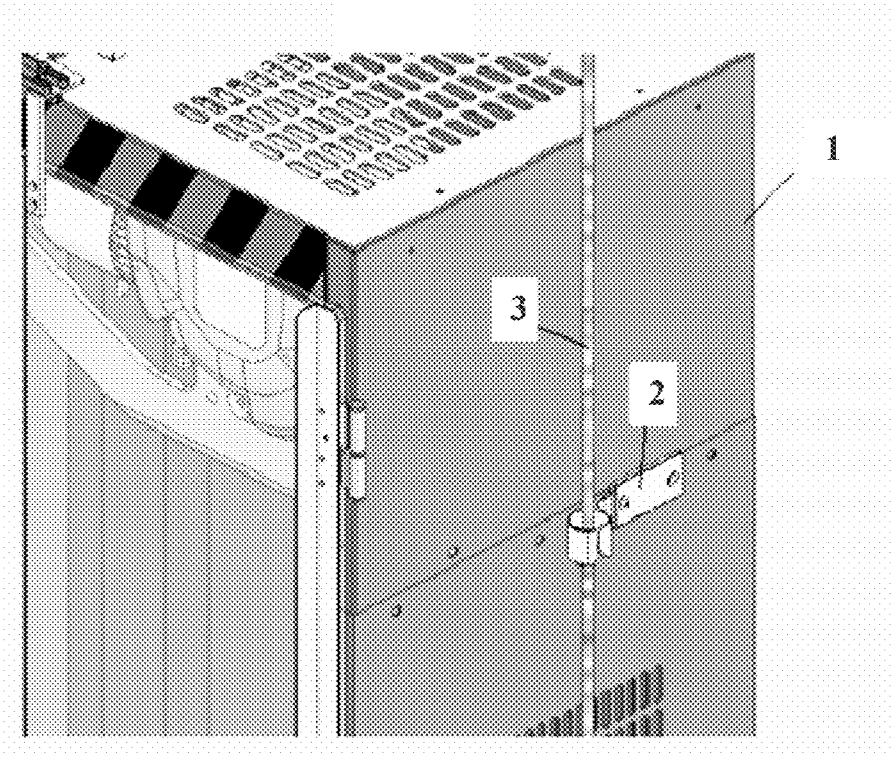
FIG. 1B (Prior Art)
FIG. 1B shows a schematic view of an elevator including a guide component.

FIG. 1B further depicts a portion of an elevator car 1. A guide component 2 is shown attached to the side of elevator car 1. Guide components of this style are in common use. Guide component 2 is attached to the side of elevator car 1 to provide stability to elevator car 1 as it travels vertically in the tower. A quantity, normally two, of guide components 2 are attached to each side of elevator car 1. Typically, guide components 2 are disposed towards the top and bottom of elevator car 1 to provide adequate stability. Static tensioned guide wire 3 is disposed to pass through guide component 2 and acts in conjunction with guide components 2 to constrain lateral movement of elevator car 1.

Figure 2:
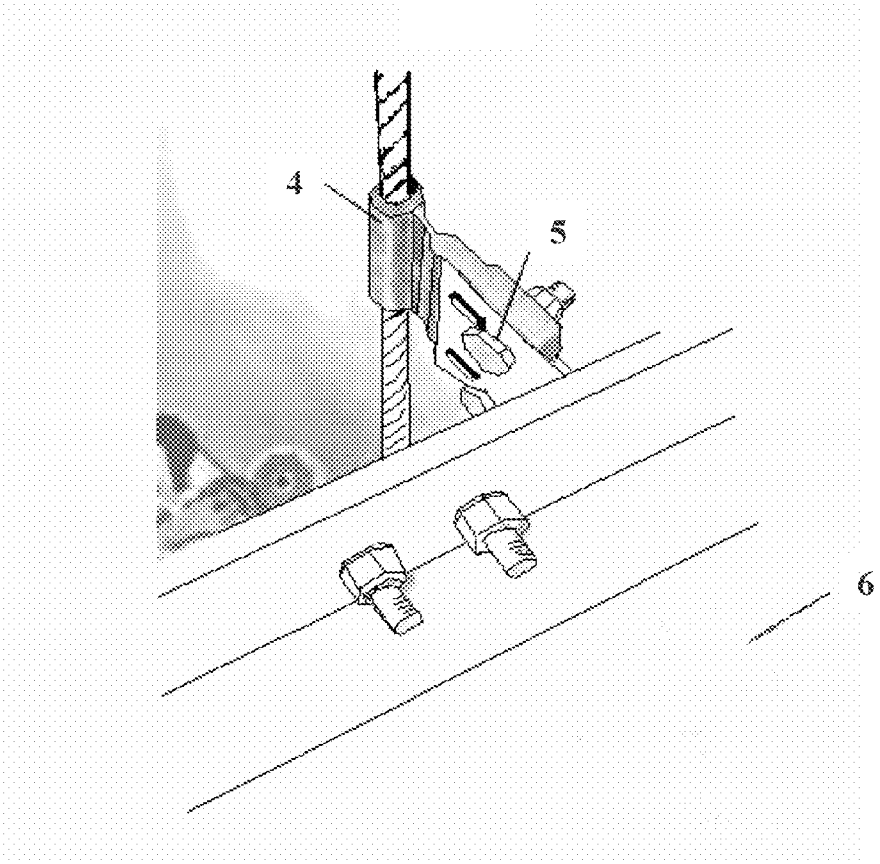
FIG. 2 (Prior Art)
FIG. 2 shows a view of a guide wire and wirefix mounting.

Referring to FIG. 2, wirefix 4 is mounted on a bracket 5. Bracket 5 further attached to a structure of the tower, typically a landing 6 of the wind tower. Wirefix 4 acts to hold guide wire 3 in a fixed position at landing 6 to provide a defined path for elevator car 1 during vertical travel and during transition through landing 6. A wirefix of this style is in common use.

Figure 3A:
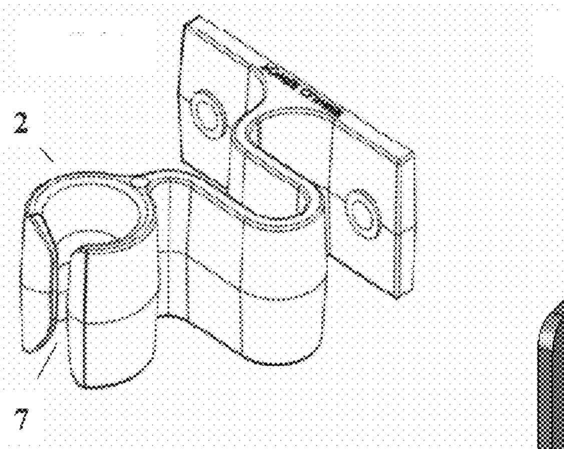
FIG. 3A (Prior Art)
FIGS. 3A and 3B show a view of a wirefix and guide component.
Figure 3B:
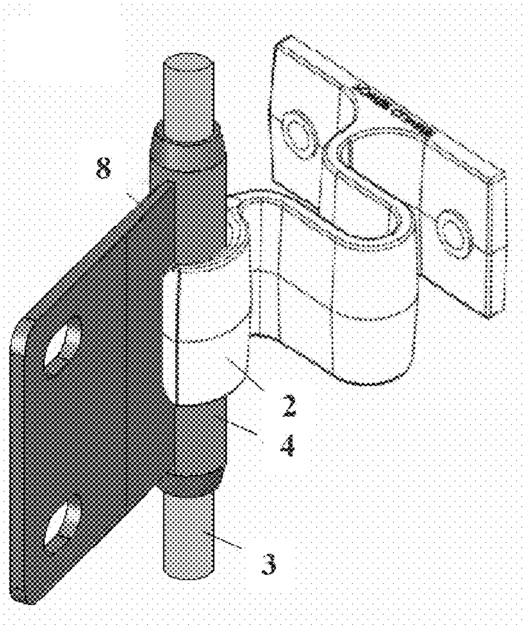
FIG. 3B (Prior Art)

Referring to FIG. 3A, slot 7 in guide component 2 attached to elevator car 1 provides a path through which tongue 8 (of FIG. 3B) of wirefix 4 may pass while elevator car 1 moving vertically, passes wirefix 4 and landing 6. Specifically, slot 7 in guide component 2 has a smaller opening than the diameter of guide wire 3, thereby constraining guide wire 3 to guide component 2.

Figure 4:
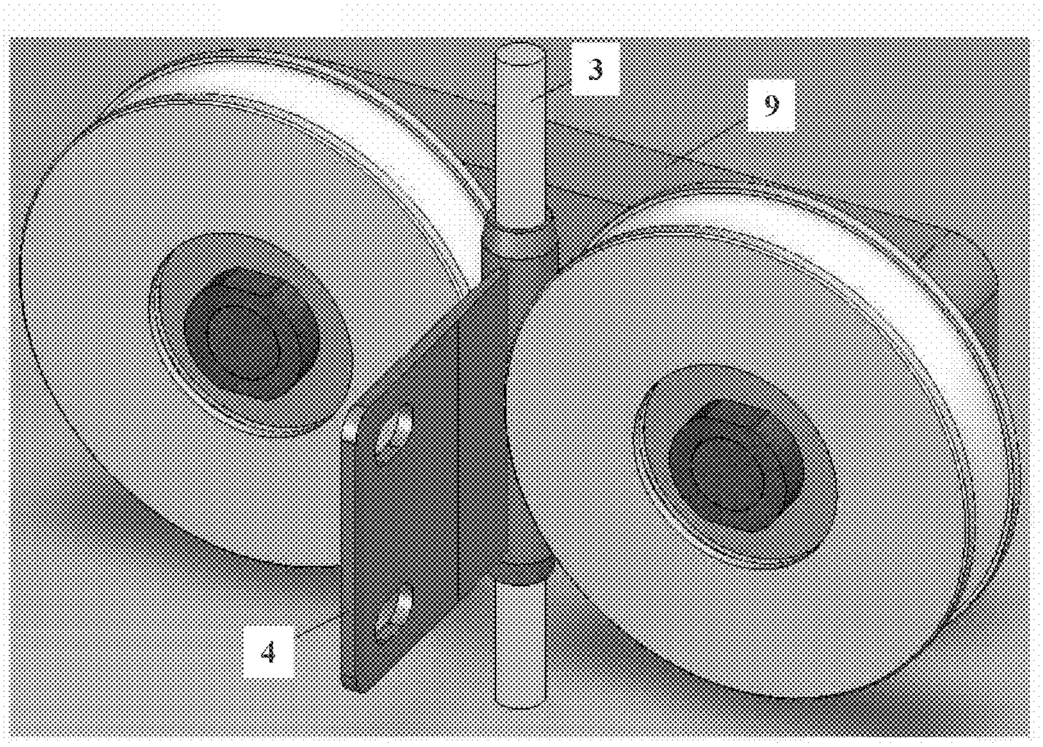
FIG. 4 (Prior Art)
FIG. 4 shows a view of a wirefix and guide component.

Referring to FIG. 4, an alternative guide component 9 is described, where wirefix 4 transitions guide component 9. Guide components of this style are in common use.

A characteristic of wirefix 4 is that guide wire 3 must be threaded through wirefix 4 during installation, and if wirefix 4 needs replacement, then guide wire 3 must be de-tensioned and wirefix 4 threaded onto guide wire 3 prior to re-tensioning of guide wire 3. This is inconvenient and causes replacement service to become relatively complex and time consuming.

It is noted that the wirefix and the guide component as described with reference to FIGS. 1, 2, 3 and 4 are known and are in use commercially.

The embodiments described with respect to FIGS. 5 through 9 illustrate a wirefix embodiments that enable a wirefix to be attached to guide wire 3 without de-tensioning guide wire 3. In that regard, in each embodiment, the wirefix may be attached or replaces in-situ. The advantages of such a wirefix are many. One particular advantage is that a wirefix may be that repairs may be made without significantly disturbing the elevator apparatus.

In particular, each wirefix shares the elements that when coupled to a length of guide wire 3, a channel 52 is formed in one portion or end of the wirefix. Further the wirefix has an attachment point 53 at another end of the wirefix so that the wirefix can be attached to a bracket or other structure that couples the wirefix to a stationary element of the tower. The channel 52 further has the feature that it can be opened onto a length of guide wire that is tensioned between an upper fixed portion or structure near a top of the tower and a lower fixed portion or structure near a bottom of the tower. In this way, the wirefix may be removed from or coupled to the guide wire without the need for de-tensioning the guide wire.

Figures 5A, 5B, 5C:
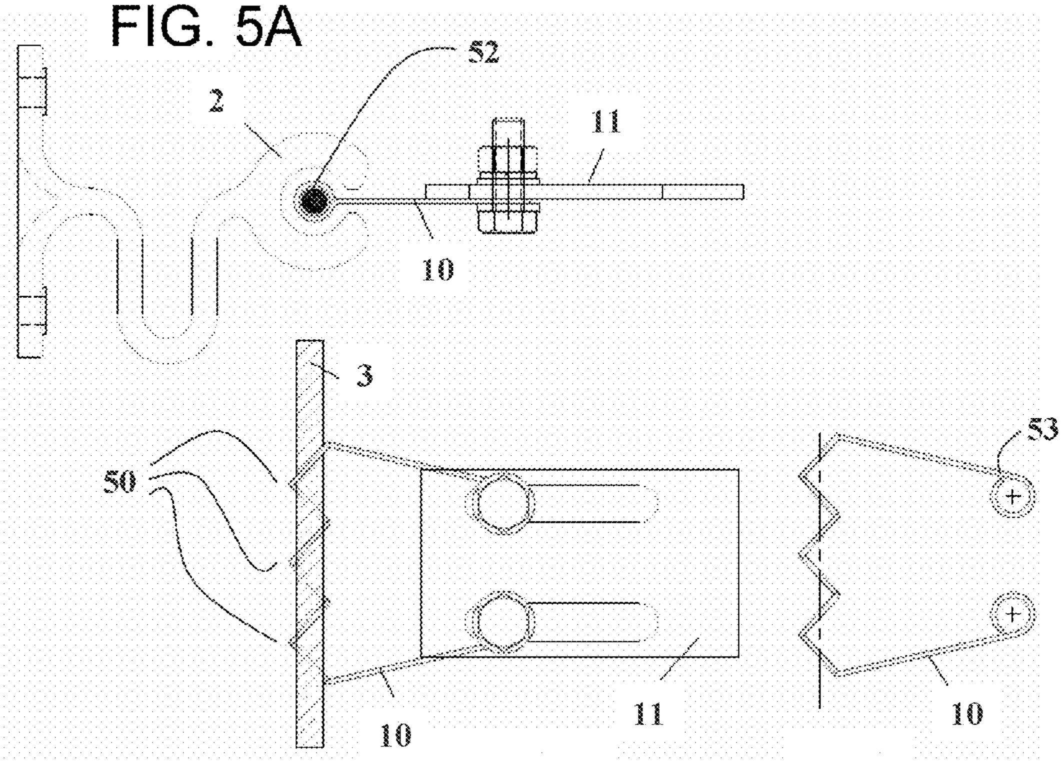
FIGS. 5A, 5B and 5C show a view of a wirefix and guide component according to an illustrative embodiment of the present invention.

FIGS. 5A, 5B and 5C, show a wirefix 10 according to an embodiment of the invention. In this embodiment, wirefix 10 is constructed as a coarse-pitch spring that can be threaded onto guide wire 3 in-situ. Wirefix 10 can be attached to landing 6 with associated clamping plate 11 and with an appropriate bracket (not shown). The pitch of the spring winding 50 is selected to enable spring winding 50 to be manipulated for fitting onto guide wire 3, or alternatively may be sufficiently expanded to enable fitting.

Figure 6:
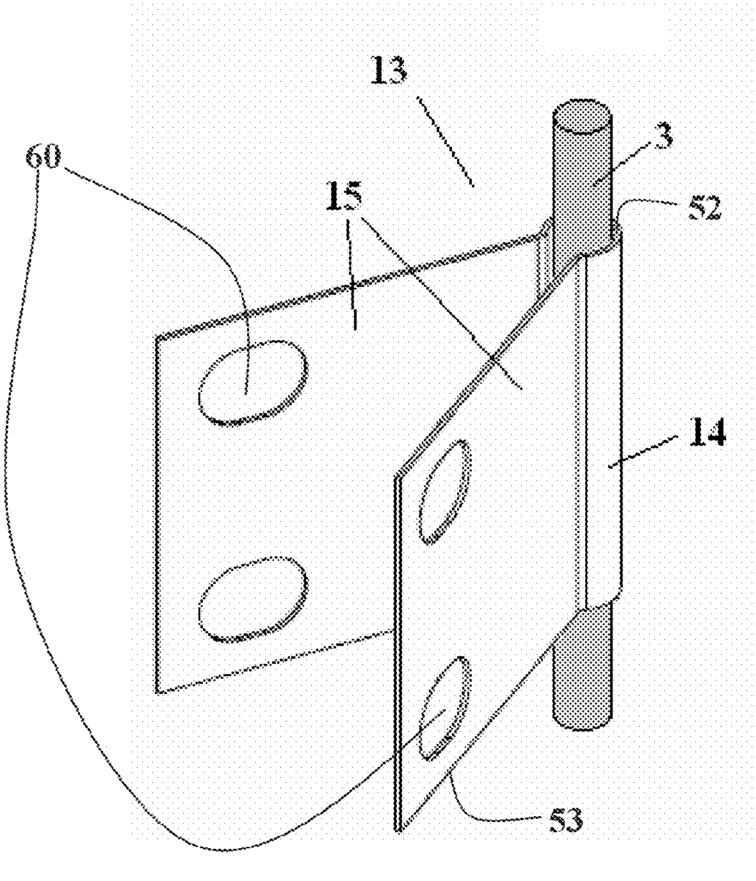
FIG. 6 shows a view of a wirefix and guide component according to an illustrative embodiment of the present invention.

FIG. 6 shows an alternative embodiment of a wirefix 13 according to an aspect of the invention and constructed as a foldable structure formed as shown to provide containment for guide wire 3. Bolt holes 60 for attachment to landing 6 are provided. Wirefix 13 may be attached to guide wire 3 in-situ by sufficiently opening two leaves 15, pressing guide wire 3 into spine 14 prior to closing leaves 15. Thereafter, leaves 15 can be attached to an appropriate bracket at landing 6.

Figure 7A:
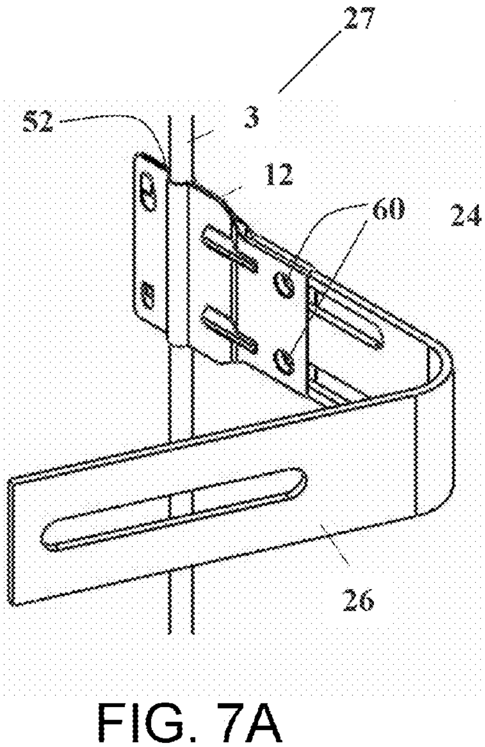
FIGS. 7A and 7B shows a schematic view of a wirefix according to an illustrative embodiment of the present invention.
Figure 7B:
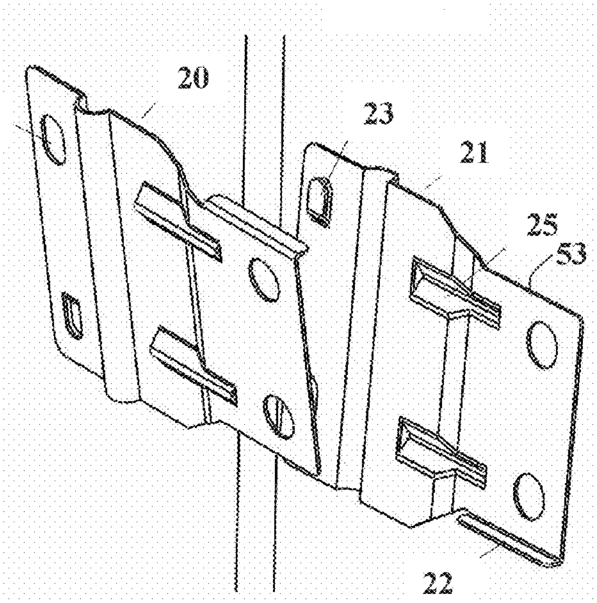

FIG. 7 shows another embodiment of wirefix 27. In this embodiment, wirefix 27 is constructed as two half plates 20, 21 formed as shown to provide containment for guide wire 3. Bolt holes 60 provide for attachment to landing 6 by, for example but not necessarily, using bracket 26. To improve the stability of the positional relationship between half plates 20, 21 when under load, each half plate 20, 21 may include locking tabs 23 that mate and lock in slot 24 to ensure containment of guide wire 3. To further reduce cost and simplify assembly, each half plate 20, 21 may be made as identical pieces, and may be made with strengthening ribs 25 as needed. To improve the positional relationship between half plates 20, 21, a flange 22 may be included.

Figure 8:
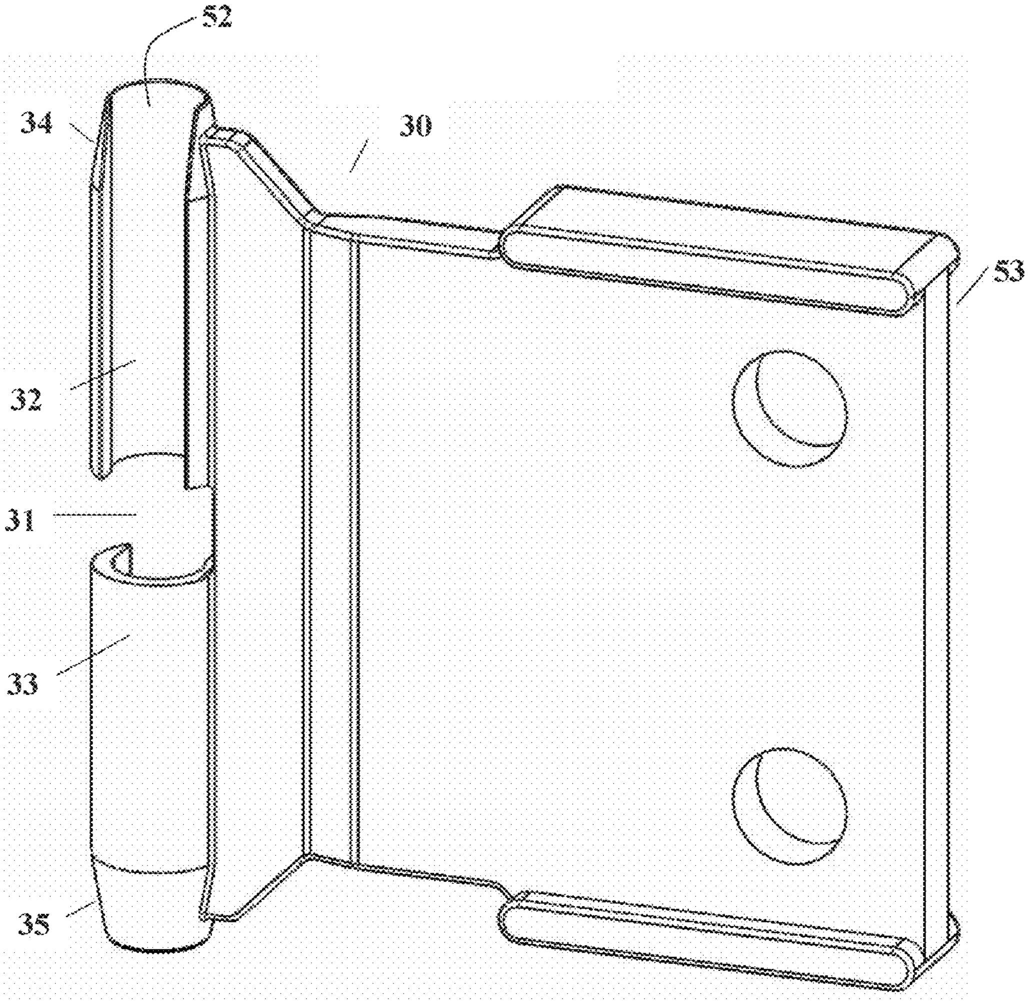
FIG. 8 shows a view of a wirefix according to an illustrative embodiment of the present invention.

FIG. 8 shows another embodiment of wirefix 30 according to an aspect of the invention. Wirefix 30 is constructed as a single piece as shown to provide containment for guide wire 3. To load wirefix 30 to guide wire 3, aperture 31 is positioned about guide wire 3 and wirefix 30 is rotated so that guide wire 3 is coaxial with partial tubular structures 32, 33 and thereby contained. Partial tubular structures 32, 33 may be formed such that the opening represented as the unfilled part of partial tubular structures 32, 33 is less than the diameter of the guide wire. As such, when wirefix 30 is rotated to load on guide wire 3, it flexes to accept guide wire 3, thereby providing additional retention force. Tapers 34, 35 may be included to facilitate entry of wirefix 30 onto guide component 2 as elevator car 1 moves vertically past wirefix 30.

Figure 9A:
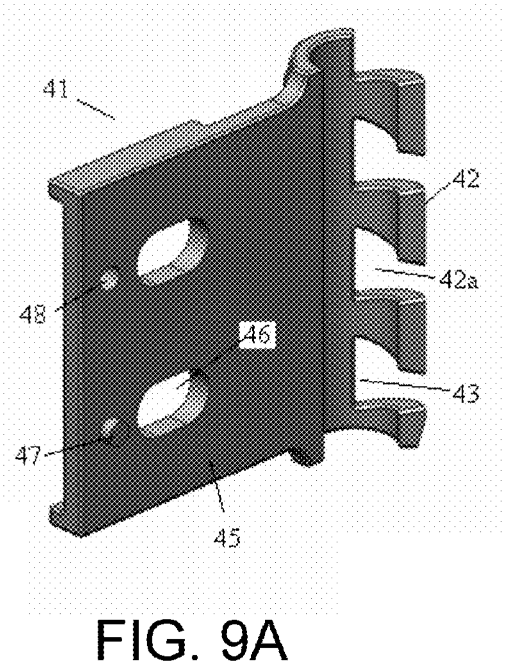
FIGS. 9A and 9B show a view of a wirefix according to an illustrative embodiment of the present invention.
Figure 9B:
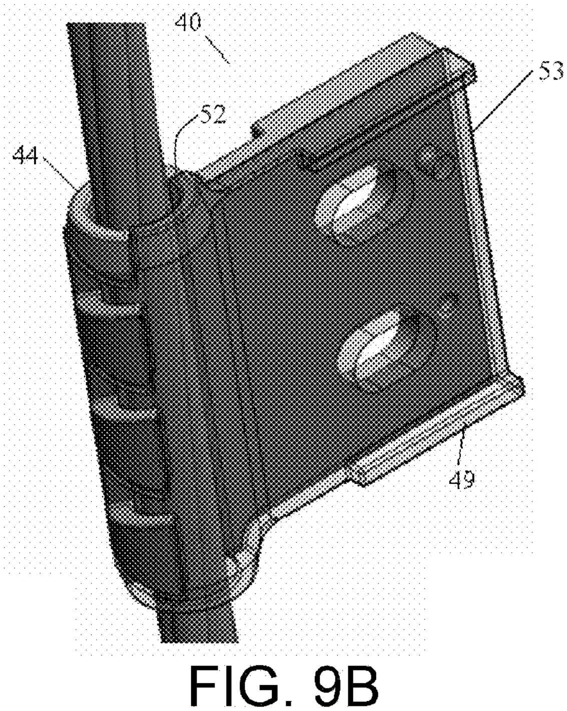

FIGS. 9A and 9B show another embodiment of wirefix 40 according to an aspect of the invention. In this embodiment, wirefix 40 is constructed as two half pieces 41. Preferably, but not necessarily, each half piece 41 is substantially identical and may be of a molded material, for example glass-filled nylon.

To provide containment of guide wire 3, fingers 42 are tapered such that when assembled into a wirefix assembly 40, fingers 42 mate into the identical complementary space 42*a* thereby providing a locking function to prevent displacement and separation.

In this embodiment, to load wirefix 40 onto guide wire 3, two half pieces 41 may be aligned such that the tip of one set of fingers 42 of one of half pieces 41 is aligned with the root 43 of the other half piece 41. Thereafter, half pieces 41 may be opened up in a "V" shape such that guide wire 3 may be coaxially located within the developed cylindrical section 44. Further, relative positioning of fingers 42 is made such that the structure depicted as 40 is achieved when flanges 45 are brought into alignment as the "V" shape is closed.

Half pieces include holes or slots 46 for clamping to a supporting structure, and may optionally include a pin 47 and hole 48 such that when assembled, alignment and maintenance of closure is ensured. Wirefix 40 is formed by 180 degree rotation about a horizontal axis in the plane of the drawing of a second half piece from the orientation of half piece 41 and uniting hole 48 with pin 49 of the second half piece.

Additional structures such as flanges 49 may be added for strengthening, and shaping of the adjacent surfaces of fingers 42 to provide a snap fit.

The wirefix embodiments described above may be used as part of the original configuration of the elevator or may be used as a retrofit to an existing structure. In either case, a service person would attach the wirefix to the tower structure, e.g., by attachment to a platform or other fixed structure. Initially, the wirefix channel is opened about the guide wire. In the case of a single piece wirefix, such as the embodiments of FIGS. 5 and 8, the guide wire is positioned in an opening in the channel and the channel portion is twisted about the guide wire. In the case of a wirefix have two portions, e.g., as illustrated in FIGS. 7 and 9 (and FIG. 6 to the extent that it has two leaves), the guide wire is placed in the channel and the two portions are brought together to close the opening about the guide wire. Thereafter, the attachment point is fixed to the tower structure or a structure that is in turn fixed to the tower structure such as a platform.

The use of the inventive wirefixes described herein can also be employed as an additive to an existing elevator. For example, in the case where additional lateral support is needed. Wirefixes could be added without disturbing the existing tension of the guide wires.

The foregoing description has set forth various embodiments of the apparatus and methods via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Furthermore, it should be emphasized that aspects of the invention described herein have a variety of applications. For example, while aspects of the invention relates to elevators used for vertical transportation, it equally applies to elevators and other mechanisms used for inclined conveyance, for example a cable car disposed on a hillside.

What is claimed:

1. An elevator system comprising:

a tower having a fixed portion proximate a top of said tower;

a length of guide wire tensioned and attached to the fixed portion; and a wirefix removably coupled between the length of guide wire and a fixed portion of said tower, and coupled to the fixed portion, said wirefix having a channel that is operable to longitudinally enclose a length of said guide wire and constraining lateral movement of the guide wire while allowing longitudinal movement of the guide wire relative to the wirefix, wherein said wirefix may be decoupled from said guide wire without de-tensioning the guide wire and while the guide wire is in-place, said wirefix constructed as a coarse-pitch spring comprising spring winding with selectable pitch to enable the spring winding to be manipulated for fitting onto the guide wire at a mid-section of the guide wire while the guide wire is in-place and without fitting onto the guide wire at an end of the guide wire;

wherein outer dimensions of portions of the wirefix surrounding the length of the guide wire are adapted to allow for the wirefix to slide within a cable guide component attached to an elevator car moving vertically on said tower, wherein the cable guide component has a slot having an opening to allow for passage of the outer dimensions of the wirefix.

2. The elevator system as recited in claim 1 wherein the channel is formed by a single piece for accepting the guide wire.

3. A wirefix for use in stabilizing a guide wire in a tower, comprising:

a channel formed in one portion of the wirefix and operable to couple the wirefix to the guide wire; wherein the channel is adapted to longitudinally enclose a length of the guide wire to couple or decouple the wirefix to the guide wire at a mid-section of the guide wire while the guide wire is in-place and without coupling onto the guide wire or decoupling from the guide wire at an end of the guide wire, and wherein the wirefix is configured to constrain lateral movement of the guide wire while allowing longitudinal movement of the guide wire relative to the wirefix; and an attachment point formed in another portion of the wirefix adapted to couple the wirefix to the tower, said wirefix constructed as a coarse-pitch spring operable to be threaded onto the guide wire, the coarse-pitch spring comprising spring winding that is expandable for fitting onto the guide wire;

wherein outer dimensions of portions of the wirefix surrounding the length of the guide wire are adapted to allow for the wirefix to slide within a cable guide component attached to an elevator car moving vertically on said tower, wherein the cable guide component has a slot having an opening to allow for passage of the outer dimensions of the wirefix.

4. The wirefix as recited in claim 3 wherein the channel is formed by a single piece for accepting the guide wire in a tensioned state.

* * * * *